(12) United States Patent
Kawaguchi et al.

(10) Patent No.: US 6,504,600 B2
(45) Date of Patent: Jan. 7, 2003

(54) CASING FOR REFLECTION MEASUREMENT DEVICE

(75) Inventors: Tetsumasa Kawaguchi, Kariya (JP); Toshio Hosokawa, Anjo (JP); Takekazu Terui, Tokai (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/897,137

(22) Filed: Jul. 3, 2001

(65) Prior Publication Data

US 2002/0005941 A1 Jan. 17, 2002

(30) Foreign Application Priority Data

Jul. 14, 2000 (JP) .......................... 2000-214566

(51) Int. Cl.⁷ .............. G01C 3/08; G01C 3/00; B60T 7/16
(52) U.S. Cl. ................. 356/4.01; 180/169; 356/3.01
(58) Field of Search ............... 356/3.01–5.15; 180/167–169

(56) References Cited

FOREIGN PATENT DOCUMENTS

| JP | 4-54746 | 5/1992 |
|----|---------|--------|
| JP | 5-14961 | 2/1993 |
| JP | 11038122 | 2/1999 |

*Primary Examiner*—Stephen C. Buczinski
(74) *Attorney, Agent, or Firm*—Law Offices of David G. Posz

(57) ABSTRACT

A casing is provided for a reflection measurement device emitting a scanning beam and receiving an echo beam caused by reflection of the scanning beam at an object, and detecting a distance to the object in response to the received echo beam. The casing has a window for conducting a beam, and a protective member being transparent to the beam and covering the window from an inside. A predetermined range through which the beam passes is provided in the window. An interval between a lower edge of the beam pass range and a lower edge of the window is greater than an interval between opposing edges of the beam pass range and the window which differ from the lower edges thereof.

18 Claims, 5 Drawing Sheets

CASING FOR REFLECTION MEASUREMENT DEVICE

BACKGROUND OF THE INVENTION

1. Field of the Invention

This invention relates to a casing for a reflection measurement device such as a device for measuring the distance to a reflective object by using a light beam or a radar device using a laser beam.

2. Description of the Related Art

A typical on-vehicle reflection measurement device emits a forward laser beam from the subject vehicle, and controls the forward laser beam to scan a prescribed area outside the subject vehicle. In the case where an object exists in the prescribed area, the forward laser beam encounters the object before being at least partially reflected thereby. Generally, a portion of the reflected laser beam returns to the measurement device as an echo laser beam. The measurement device converts the echo laser beam into an electric echo signal. The measurement device processes the electric echo signal into data for object recognition or detection purposes.

Such an on-vehicle reflection measurement device can be used in an apparatus for alerting a driver when an obstacle (for example, a preceding vehicle) to the subject vehicle is detected. Also, the measurement device can be used in an apparatus for controlling the speed of the subject vehicle to maintain the distance from a preceding vehicle in a safe range.

The on-vehicle reflection measurement device is provided with a casing for housing members and parts of the device. The casing has an outlet window via which the forward laser beam is propagated. The casing also has an inlet window via which a return laser beam (an echo laser beam) enters the device. Plate-like protective covers transparent to laser beams extend over the inlet and outlet windows, respectively. The protective covers are supported by inner surfaces of the walls of the casing. The protective covers prevent pebbles and raindrops from entering the casing.

The upwardly-facing surface of the walls of the casing which defines the lower side of the outlet window is exposed to the atmosphere. Rainwater tends to be collected on this wall surface. When the forward laser beam meets the collected rainwater and passes therethrough, it is scattered and partially absorbed thereby. As a result, the power of the forward laser beam reaching an object, and also the power of a return laser beam coming from the object are reduced. The power reduction causes a decrease in the detectable distance to an object.

Japanese patent application publication number 11-38122 discloses a casing for a reflection measurement device. The casing in Japanese application 11-38122 has drain grooves to enable rainwater to escape from the lower side of an outlet window. During the manufacture of the casing, a special processing step is required to make the drain grooves.

Japanese utility model application publication number 4-54746 discloses an on-vehicle laser radar device. The laser radar device in Japanese application 4-54746 includes a cylindrical hood provided on a front of a laser radar head. The hood covers a laser emitting section and a laser receiving section. During the travel of the subject vehicle, wind coming from the front thereof acts as a dynamic pressure in the hood. Under rainy conditions, the dynamic pressure directs raindrops toward the sides of the hood, thereby preventing them from meeting the front surface of the laser radar head.

Japanese utility model application publication number 5-14961 discloses an inter-vehicle distance measurement device using a laser beam. The measurement device in Japanese application 5-14961 has a front surface covered with a lens. A wiper is provided to clean a surface of the lens. Cleaning liquid can be injected from a nozzle toward the lens surface. A dirt sensor acts to detect dirt on the lens surface. The injection of cleaning liquid from the nozzle and the drive of the wiper are controlled in response to the output signal of the dirt sensor.

SUMMARY OF THE INVENTION

It is an object of this invention to provide a casing for a reflection measurement device which can be manufactured without a special processing step, and which can prevent rainwater from collecting in the lower edge of an outlet window.

A first aspect of this invention provides a casing for a reflection measurement device emitting a scanning beam and receiving an echo beam caused by reflection of the scanning beam at an object, and detecting a distance to the object in response to the received echo beam. The casing comprises a window through which a beam is transmitted; and a protective member being transparent to the beam and internally covering the window. The window provides a predetermined range through which the beam passes, and an interval between a lower edge of the beam pass range and a lower edge of the window is greater than an interval between opposing edges of the beam pass range and the window which differ from the lower edges thereof.

A second aspect of this invention provides a casing for a reflection measurement device emitting a scanning beam and receiving an echo beam caused by reflection of the scanning beam at an object, and detecting a distance to the object in response to the received echo beam. The casing comprises a window through which a beam is transmitted, and a protective member that is transparent to the beam and that internally covers the window. The window provides a predetermined range through which the beam passes, and an area of a zone between a lower edge of the beam pass range and a lower edge of the window is greater than an area of a zone between opposing edges of the beam pass range and the window which differ from the lower edges thereof.

A third aspect of this invention is based on the first aspect thereof, and provides a casing including a casing member defining the window and a resilient member provided between the casing member and the protective member and non-projecting into the window.

A fourth aspect of this invention is based on the first aspect thereof, and provides a casing wherein the lower edge of the window inclines at a predetermined angle relative to the lower edge of the beam pass range.

A fifth aspect of this invention is based on the first aspect thereof, and provides a casing wherein the window has a pentagonal shape with a downwardly-projecting lower side.

A sixth aspect of this invention is based on the first aspect thereof, and provides a casing wherein the lower edge of the window tapers as viewed in a direction perpendicular to a plane of the window.

DETAILED DESCRIPTION OF THE INVENTION

Prior-art casings for reflection measurement devices will be explained below for a better understanding of this invention.

Figure 1:
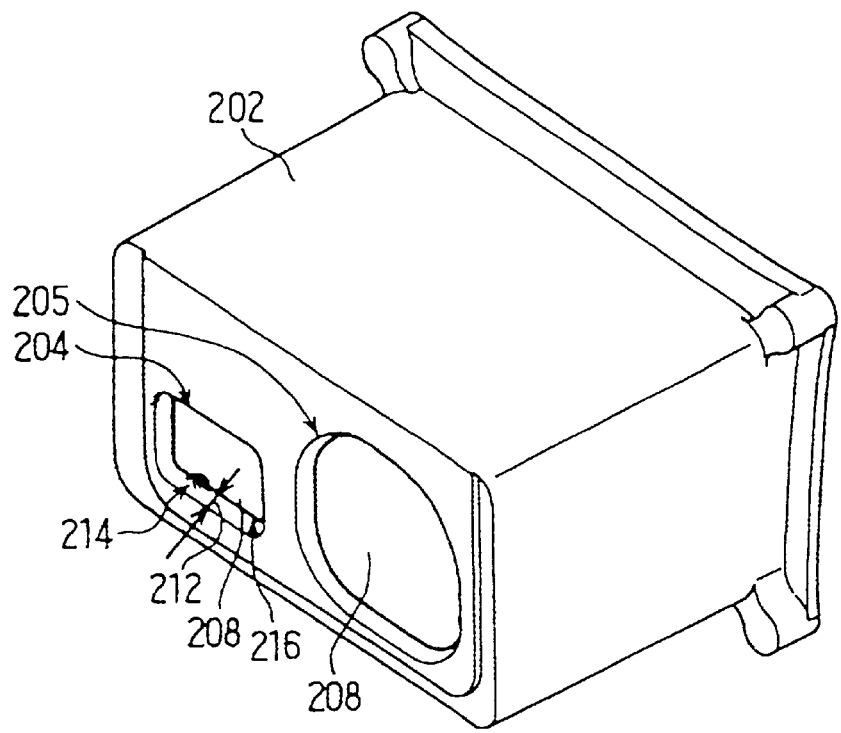
FIG. 1 is a perspective view of a first prior-art casing for a reflection measurement device.

FIG. 1 shows a first prior-art casing 202 for a reflection measurement device. A front panel of the casing 202 has an outlet window 204 via which a forward laser beam is propagated. The front panel of the casing 202 also has an inlet window 205 via which a return laser beam (an echo laser beam) enters the device.

Plate-like protective covers 208 transparent to laser beams extend over the outlet and inlet windows 204 and 205, respectively. The protective covers 208 are supported by inner surfaces of the walls of the front casing panel. The protective covers 208 prevent pebbles and raindrops from entering the casing 202 via the outlet and inlet windows 204 and 205.

The walls of the front casing panel have surfaces defining the outlet window 204. The protective cover 208 for the outlet window 204 contacts with and extends along the inner surfaces of the walls of the front casing panel. Accordingly, the upwardly-facing surface of the walls of the front casing panel which defines the lower side of the outlet window 204 is exposed to the atmosphere. The upwardly-facing surface of the walls has a width 212 equal to the thickness of the walls. In the outlet window 204, there is a corner 216 between the upwardly-facing surface of the walls and a surface of the related protective cover 208. The corner 216 extends along the inner edge of the upwardly-facing surface of the walls.

Rainwater 214 tends to be collected in the corner 216 in the outlet window 204. When the forward laser beam meets the collected rainwater 214 and passes therethrough, it is scattered and partially absorbed thereby. As a result, the power of the forward laser beam reaching an object, and also the power of a return laser beam coming from the object are reduced. The power reduction causes a decrease in the detectable distance to an object.

Figure 2:
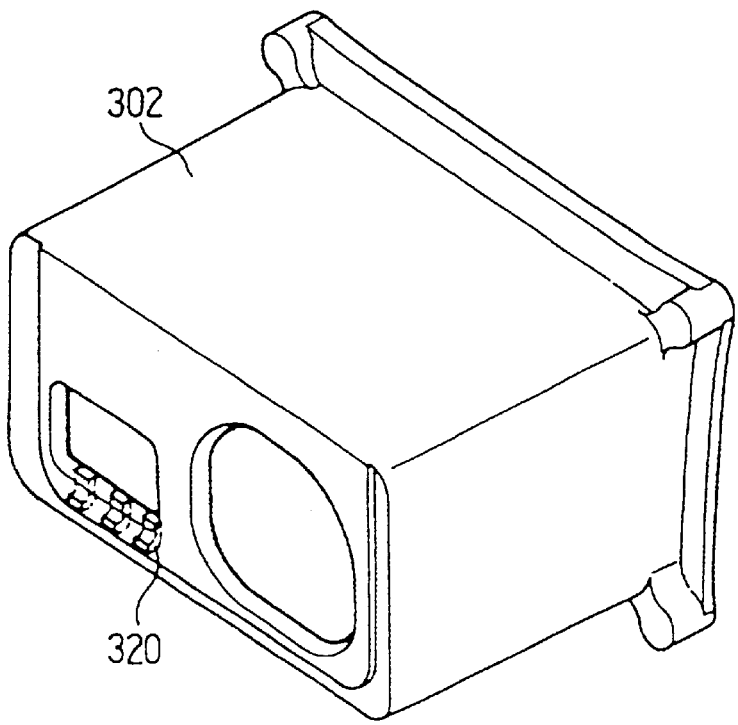
FIG. 2 is a perspective view of a second prior-art casing for a reflection measurement device.

FIG. 2 shows a second prior-art casing 302 for a reflection measurement device which is disclosed in Japanese patent application publication number 11-38122. A front panel of the casing 302 has an outlet window via which a forward laser beam is propagated. The walls of the front panel of the casing 302 have drain grooves 320 extending downward from the upwardly-facing surface of the walls of the front casing panel which defines the lower side of the outlet window. The drain grooves 320 enable rainwater to escape from the lower side of the outlet window. During the manufacture of the casing 302, a special processing step is required to make the drain grooves 320.

First Embodiment

Figure 3:
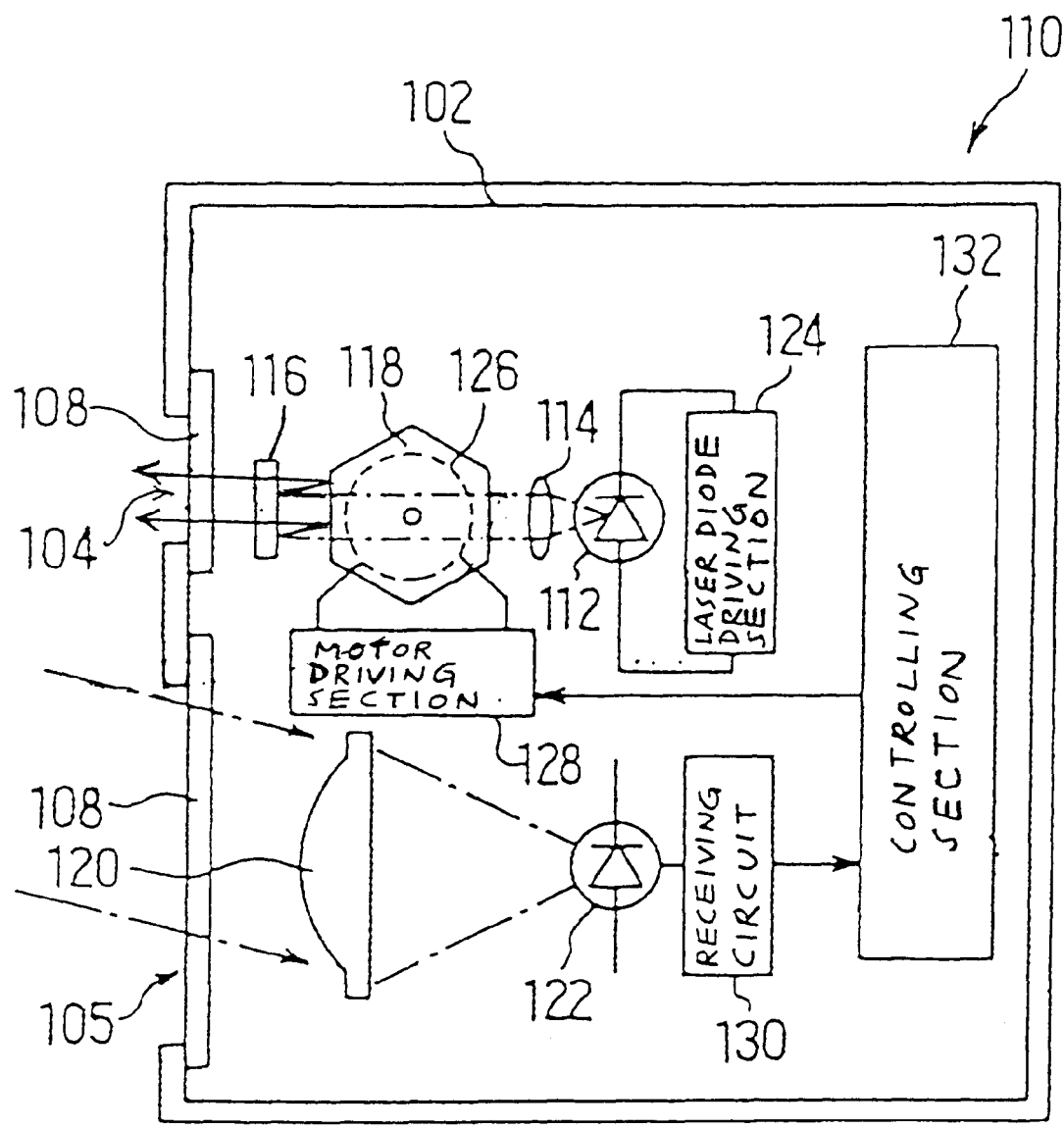
FIG. 3 is a diagram of a reflection measurement device provided with a casing according to a first embodiment of this invention.

FIG. 3 shows a reflection measurement device 110 provided with a casing 102 according to a first embodiment of this invention. The casing 102 houses members and parts of the device 110. The device 110 includes an optical system disposed in the casing 102. The optical system has a laser diode 112, a collimator lens 114, a mirror 116, a polygon mirror 118, a condenser lens 120, and a photodiode 122.

The laser diode 112 converts an electric signal into infrared laser light. The laser diode 112 emits the laser light toward the collimator lens 114. The collimator lens 114 changes the laser light into a parallel laser beam directed toward the mirror 116. The mirror 116 reflects the parallel laser beam toward the polygon mirror 118. The polygon mirror 118 reflects the parallel laser beam. The reflection-resultant laser beam travels from the polygon mirror 118 as a forward laser beam (a scanning laser beam). The polygon mirror 118 is rotatable. As the polygon mirror 118 rotates, the direction of travel of the forward laser beam changes in a prescribed angular range. Thus, during the rotation of the polygon mirror 118, a detection area corresponding to the prescribed angular range is scanned by the forward laser beam. The condenser lens 120 gathers a return laser beam (an echo laser beam) on the photodiode 122. The photodiode 122 converts the return laser beam into an echo electric signal. The photodiode 122 outputs the echo electric signal.

The device 110 includes a laser-diode driving section 124, a polygon scanner motor 126, a motor driving section 128, a receiving circuit 130, and a controlling section 132 which are disposed in the casing 102.

The laser-diode driving section 124 acts to drive the laser diode 112. The polygon mirror 118 is rotated by the polygon scanner motor 126. The motor driving section 128 acts to drive the polygon scanner motor 126. Thus, the rotation of the polygon mirror 118 can be controlled via the motor driving section 128. The receiving circuit 130 amplifies and wave-shapes the output signal of the photodiode 122. The receiving circuit 130 outputs the resultant signal to the controlling section 132. The controlling section 132 controls the laser-diode driving section 124 and the motor driving section 128, thereby enabling the forward laser beam to scan the detection area. The controlling section 132 processes the output signal of the receiving circuit 130 to calculate, for example, the distance to an object (or an obstacle) in the detection area, and the position and relative speed of the object.

The device 110 is mounted on a vehicle referred to as the subject vehicle (the present vehicle) hereafter. In general, the device 110 is located at the front surface of the body of the subject vehicle. The detection area which is scanned by the forward laser beam extends ahead of the subject vehicle. The device 110 emits the forward laser beam into the detection area.

Figure 5:
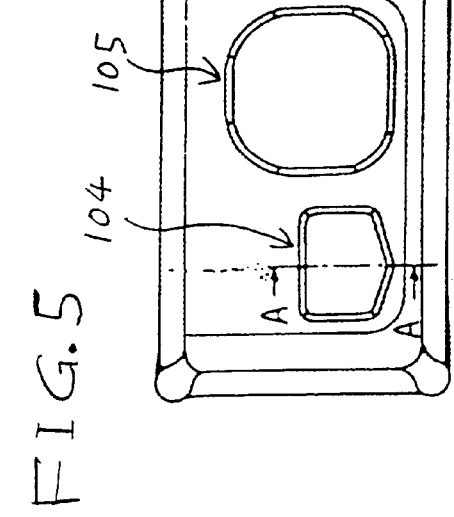
FIG. 5 is a front view of the casing in FIGS. 3 and 4.
Figure 4:
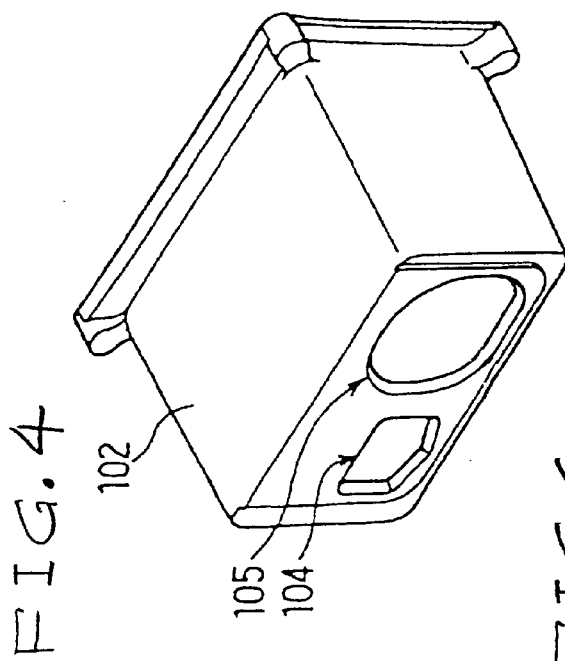
FIG. 4 is a perspective view of the casing in FIG. 3.

As shown in FIG. 4, the casing 102 has a shape of a rectangular paralelpiped or a shape of a box. The casing 102 is formed by, for example, shaping an aluminum plate. As shown in FIGS. 3, 4, and 5, the casing 102 has a front panel formed with an outlet window 104 and an inlet window 105. The forward laser beam coming from the polygon mirror 118 passes through the outlet window 104. A return laser beam (an echo laser beam) passes through the inlet window 105 before reaching the condenser lens 120. The outlet window 104 has a pentagonal shape with a downwardly-projecting lower side of a V configuration.

Figure 6:
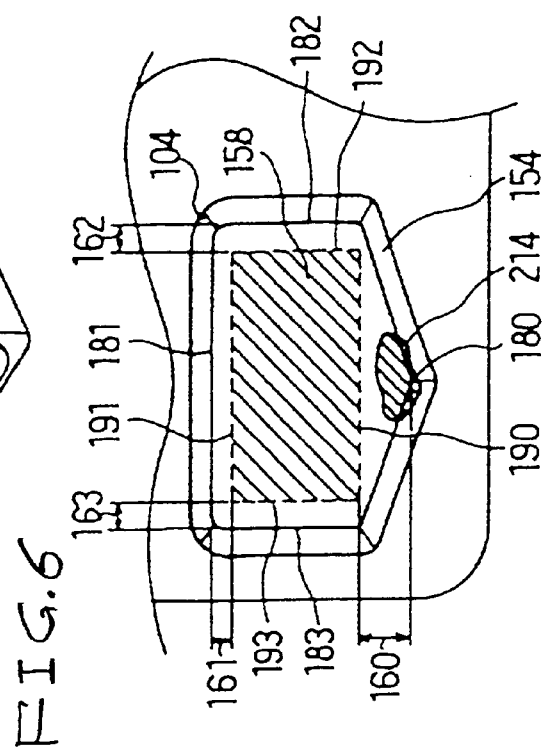
FIG. 6 is a front view of an outlet window in FIGS. 3–5.

With reference to FIG. 6, during the scanning of the detection area, the forward laser beam moves over a rectangular range (a rectangular region) 158 as viewed in a cross section of the outlet window 104, that is, as viewed in a plane of the outlet window 104. The rectangular range 158 is also referred to as the laser pass range 158. The laser pass range 158 is smaller than the outlet window 104, and is contained therein as viewed from the front. All the sides of the laser pass range 158 are separate from the edges 154 of the outlet window 104. Specifically, the lower edge (the lower side) 190 of the laser pass range 158 is separate from a lowermost part or end 180 in the lower edge of the outlet window 104 at a predetermined relatively-large interval 160. The upper edge (the upper side) 191 of the laser pass range 158 is separate from the upper edge 181 of the outlet window 104 at a predetermined interval 161. The right-hand edge (the right-hand side) 192 of the laser pass range 158 is separate from the right-hand edge 182 of the outlet window 104 at a predetermined interval 162. The left-hand edge (the left-hand side) 193 of the laser pass range 158 is separate from the left-hand edge 183 of the outlet window 104 at a predetermined interval 163. The interval 160 between the lower edge 190 of the laser pass range 158 and the lowermost part or end 180 in the lower edge of the outlet window 104 is greater than the other intervals 161, 162, and 163. Preferably, the area of the zone between the lower edge 190 of the laser pass range 158 and the lower edge of the outlet window 104 is greater than the area of the zone between the upper edge 191 of the laser pass range 158 and the upper edge 181 of the outlet window 104, the area between the right-hand edge 192 of the laser pass range 158 and the right-hand edge 182 of the outlet window 104, and the area between the left-hand edge 193 of the laser pass range 158 and the left-hand edge 183 of the outlet window 104.

It should be noted that the interval 160 may be greater than at least one of the other intervals 161, 162, and 163.

Figure 7:
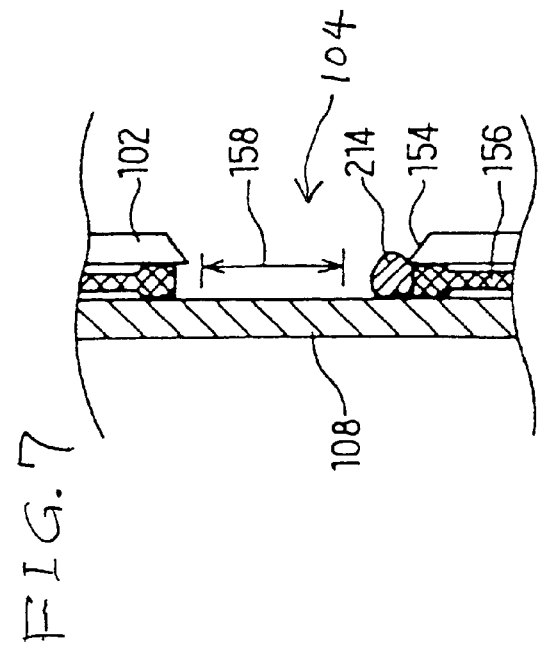
FIG. 7 is a sectional view of the outlet window which is taken along the line A—A in FIG. 5.

As shown in FIG. 7, a plate-like protective cover 108 disposed in the casing 102 extends over the outlet window 104. In other words, the protective member 108 covers the outlet window 104 from inside. The protective cover 108 is connected to and supported by the casing 102. The protective cover 108 is parallel to the front panel of the casing 102. The protective cover 108 is located near the front panel of the casing 102. The protective cover 108 is transparent to the forward laser beam. The protective cover 108 includes a glass plate or a resin plate. A ring-shaped resilient member or a rubber ring 156 is airtightly (fluid-tightly or liquid-tightly) provided between the protective cover 108 and the front panel of the casing 102. The rubber ring 156 serves as a sealing member for preventing sands and raindrops from entering the casing 102. The walls of the front panel of the casing 102 have surfaces defining the edges 154 of the outlet window 104. These surfaces 154 are tapered so that the cross section of the outlet window 104 continuously increases as viewed in the outward direction (the forward direction) which is perpendicular to a plane of the outlet window 104. The rubber ring 156 does not project into the outlet window 104.

It is preferable that the size of the edges 154 of the outlet window 104 is relatively small, and the area of an exposed portion of the protective cover 108 is relatively small. In this case, stray light, pebbles, and raindrops can be effectively prevented from adversely affecting the device 110.

Since the outlet window 104 has a pentagonal shape with a downwardly-projecting lower side, rainwater is guided toward the lowermost part 180 of the lower edge of the outlet window 104. As shown in FIG. 6, even in the case where rainwater 214 is collected in the lowermost part 180 of the lower edge of the outlet window 104, the collected rainwater 214 does not reach the laser pass range 158 since the lower edge 190 of the laser pass range 158 is separate from the lowermost part 180 in the lower edge of the outlet window 104 at the relatively-large interval 160. The tapered edges 154 of the outlet window 104 facilitate the flow of the rainwater 214 out of the outlet window 104. Accordingly, the forward laser beam is prevented from meeting the collected rainwater 214. Thus, it is possible to prevent the occurrence of the scatter and absorption of the forward laser beam by the collected rainwater which would cause a reduction of the power of the forward laser beam and a decrease in the detectable distance to an object. In addition, even under a rainy condition, the device 110 can accurately detect an object in the detection area.

As previously mentioned, the rubber ring 156 is airtightly (fluid-tightly or liquid-tightly) provided between the protective cover 108 and the front panel of the casing 102. The rubber ring 156 prevents sands and raindrops from entering the casing 102. Since the rubber ring 156 does not project into the outlet window 104, a recess can be formed among the rubber ring 156, the protective cover 108, and the front panel of the casing 102 (see FIG. 7). Even in the case where rainwater 158 is collected into this recess, the collected rainwater 214 does not reach the laser pass range 158 (see FIG. 7).

Preferably, the cross-sectional area of the inlet window 105 is large enough to prevent a return laser beam (an echo laser beam) from being scattered and absorbed by rainwater collected in the lower edge of the inlet window 105.

Second Embodiment

Figure 8:
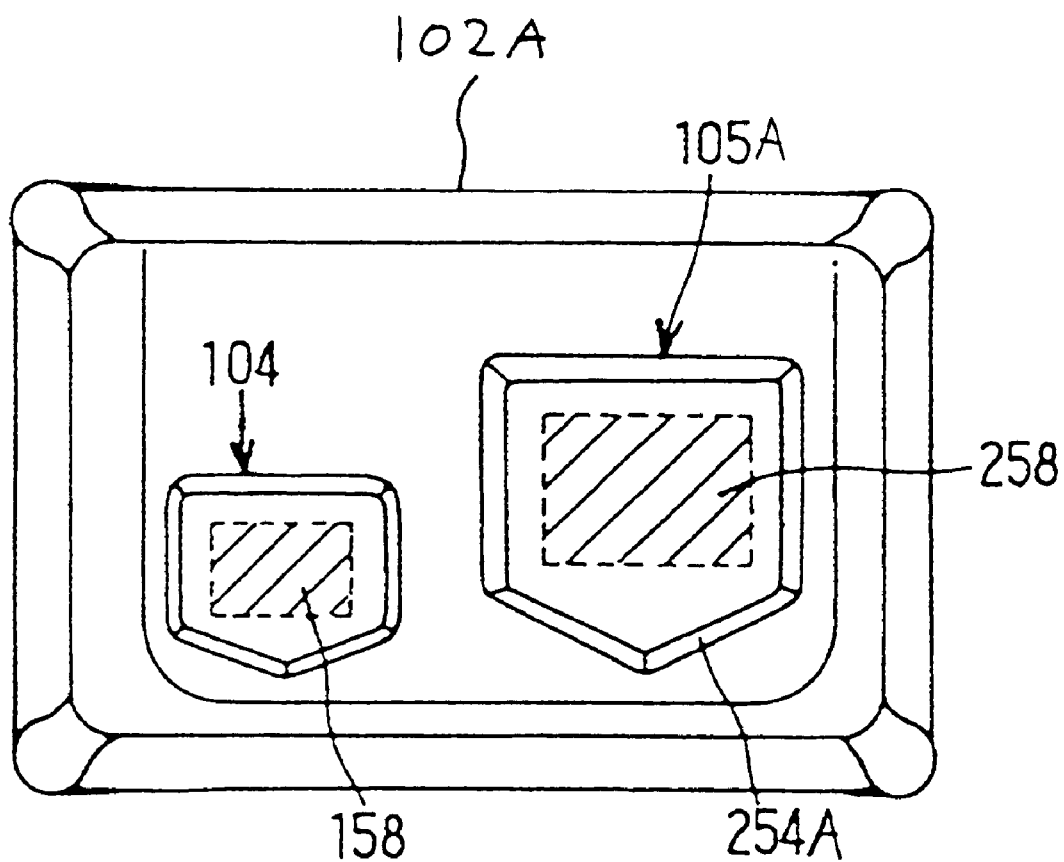
FIG. 8 is a front view of a casing for a reflection measurement device according to a second embodiment of this invention.

FIG. 8 shows a casing 102A according to a second embodiment of this invention. The casing 102A is similar to the casing 102 (see FIGS. 3–7) except for design changes mentioned hereafter. The casing 102A has an inlet window 105A instead of the inlet window 105 (see FIGS. 3–5).

As shown in FIG. 8, the inlet window 105A of the casing 102A is similar in design to the outlet window 104. Specifically, the inlet window 105A has a pentagonal shape with a downwardly-projecting lower side of a V configuration.

There is a rectangular range 258 in the inlet window 105A. Return laser beams (each laser beams) reach the photodiode 122 through the condenser lens 120 (see FIG. 3) provided that they pass through positions in the rectangular range 258. The rectangular range 258 is also referred to as the laser pass range 258. The laser pass range 258 is smaller than the inlet window 105A, and is contained therein as viewed from the front. All the sides of the laser pass range 258 are separate from the edges 254 of the inlet window 105A. The interval between the lower edge of the laser pass range 258 and the lowermost part or end in the lower edge of the inlet window 105A is greater than the interval between the upper edge of the laser pass range 258 and the upper edge of the inlet window 105A, the interval between the right-hand edge of the laser pass range 258 and the right-hand edge of the inlet window 105A, and the interval between the left-hand edge of the laser pass range 258 and the left-hand edge of the inlet window 105A.

This design of the inlet window 105A effectively prevents stray light, pebbles, and raindrops from adversely affecting the related reflection measurement device. Even in the case where rainwater is collected in the lowermost part of the lower edge of the inlet window 105A, the collected rainwater does not reach the laser pass range 258. Accordingly, a return laser beam (an echo laser beam) to be received by the photodetector 122 (see FIG. 3) is prevented from meeting the collected rainwater. Thus, it is possible to prevent the occurrence of the scatter and absorption of the return laser beam by the collected rainwater which would cause a reduction of the power of the return laser beam and a decrease in the detectable distance to an object.

Third Embodiment

Figure 9:
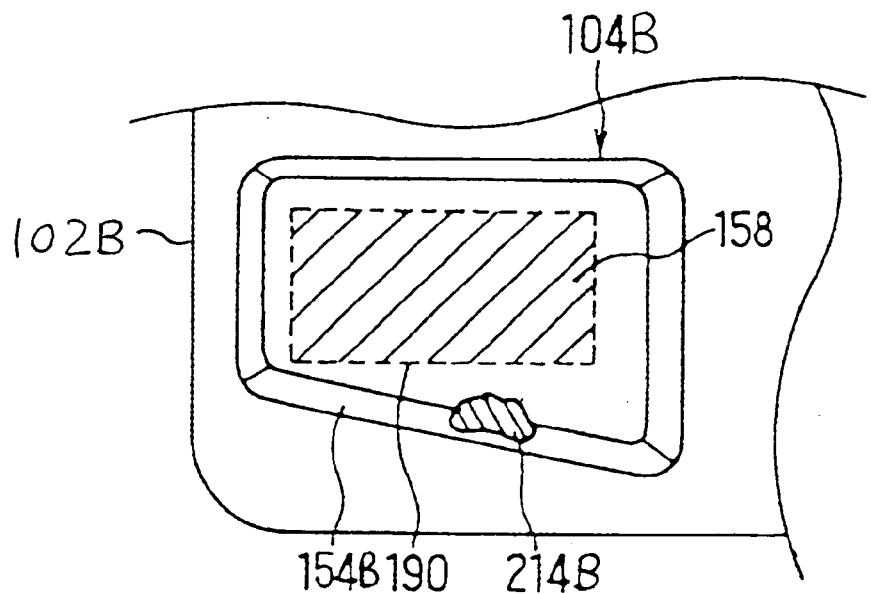
FIG. 9 is a front view of an outlet window in a casing for a reflection measurement device according to a third embodiment of this invention.

FIG. 9 shows a casing 102B according to a third embodiment of this invention. The casing 102B is similar to the casing 102 (see FIGS. 3–7) except for design changes mentioned hereafter.

As shown in FIG. 9, an outlet window 104B of the casing 102B has a trapezoidal shape with a lower side oblique relative to the horizontal direction. All the sides of the laser pass range 158 are separate from the edges 154B of the outlet window 104B. The lower edge of the outlet window 104B inclines at a predetermined angle relative to the lower edge 190 of the laser pass range 158. Since the lower edge of the outlet window 104B inclines, rainwater 214B can be smoothly guided therealong toward a lowermost part in the outlet window 104B. This is effective in preventing the forward laser beam from meeting collected rainwater.

The walls of the front panel of the casing 102B have surfaces defining the edges 154B of the outlet window 104B. These surfaces 154B are tapered so that the cross section of the outlet window 104B continuously increases as viewed in the outward direction (the forward direction) which is perpendicular to a plane of the outlet window 104B.

Fourth Embodiment

Figure 10:
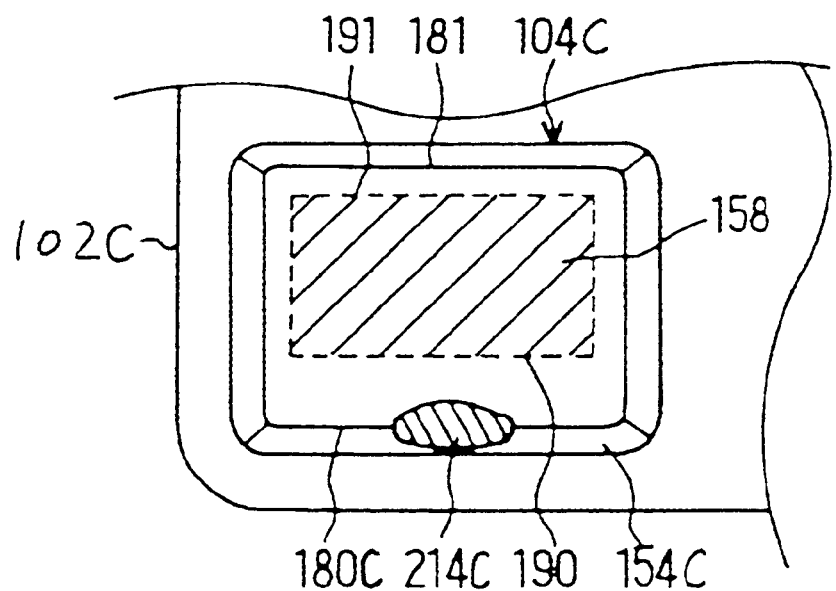
FIG. 10 is a front view of an outlet window in a casing for a reflection measurement device according to a fourth embodiment of this invention.

FIG. 10 shows a casing 102C according to a fourth embodiment of this invention. The casing 102C is similar to the casing 102 (see FIGS. 3–7) except for design changes mentioned hereafter. The casing 102C has an outlet window 104C instead of the outlet window 104 (see FIGS. 3–5).

As shown in FIG. 10, the outlet window 104C of the casing 102C has a rectangular shape. All the sides of the laser pass range 158 are separate from the edges 154C of the outlet window 104C. The interval between the lower edge 190 of the laser pass range 158 and the lower edge 180C of the outlet window 104C is greater than the interval between the upper edge 191 of the laser pass range 158 and the upper edge 181 of the outlet window 104C, the interval between the right-hand edge of the laser pass range 158 and the right-hand edge of the outlet window 104C, and the interval between the left-hand edge of the laser pass range 158 and the left-hand edge of the outlet window 104C. Accordingly, the forward laser beam is prevented from meeting rainwater 214C collected in the lower edge of the outlet window 104C.

The walls of the front panel of the casing 102C have surfaces defining the edges 154C of the outlet window 104C. These surfaces 154C are tapered so that the cross section of the outlet window 104C continuously increases as viewed in the outward direction (the forward direction) which is perpendicular to a plane of the outlet window 104C.

What is claimed is:

1. A casing for a reflection measurement device comprising:
   a window through which a scanning beam may be transmitted; and
   a protective member that is transparent to the scanning beam and that is for internally covering the window;
   wherein the window provides a predetermined beam pass range through which the scanning beam passes, and
   wherein an interval between a lower edge of the beam pass range and a lower edge of the window is greater than intervals between respective side edges of the beam pass range and the window and an interval between respective upper edges of the beam pass range and the window so that the lower edge of the window forms a rainwater guide.

2. A casing as recited in claim 1, further comprising a casing member defining the window, and a resilient member provided between the casing member and the protective member and non-projecting into the window.

3. A casing as recited in claim 1, wherein the lower edge of the window inclines at a predetermined angle relative to the lower edge of the beam pass range.

4. A casing as recited in claim 1, wherein the window has a pentagonal shape with a downwardly-projecting lower side.

5. A casing as recited in claim 1, wherein the lower edge of the window tapers as viewed in a direction perpendicular to a plane of the window.

6. A casing as recited in claim 1, wherein the lower edge of the window comprises a V-shaped lower edge.

7. A casing as recited in claim 1, wherein the lower edge of the window comprises an edge that slopes downwardly from a first side of the window to a second side thereof.

8. A casing as recited in claim 1, wherein the inclined bottom edge comprises an edge that tapers outwardly from the scanning beam window in a scanning beam transmission direction.

9. A casing for a reflection measurement device comprising:
   a window through which a scanning beam may be transmitted; and
   a protective member that is transparent to the scanning beam and that is for internally covering the window;
   wherein the window provides a predetermined beam pass range through which the scanning beam passes, and
   wherein an area of a zone between a lower edge of the beam pass range and a lower edge of the window is greater than respective areas of all other zones between corresponding opposing edges of the beam pass range and the window so that the lower edge of the window forms a rainwater guide.

10. A casing as recited in claim 9, wherein the lower edge of the window comprises a V-shaped lower edge.

11. A casing as recited in claim 9, wherein the lower edge of the window comprises an edge that slopes downwardly from a first side of the window to a second side thereof.

12. A casing as recited in claim 9, wherein the lower edge of the window comprises an edge that tapers outwardly from the scanning beam window in a scanning beam transmission direction.

13. A reflection measurement device comprising:
   a device casing including a front panel;
   a scanning beam window defined by the front panel through which a scanning beam having a predetermined beam scanning range may be transmitted; and
   a protective member that is transparent to the scanning beam and that is for covering the window from a scanning beam transmission side;
   wherein the window includes an inclined bottom edge that forms a rain guide for channeling rainwater away from the predetermined beam scanning range.

14. The reflection measurement device of claim 13, wherein the inclined bottom edge comprises a V-shaped bottom edge.

15. The reflection measurement device of claim 13, wherein the inclined bottom edge comprises an edge that slopes downwardly from a first side of the scanning beam window to a second side thereof.

16. The reflection measurement device of claim 13, wherein the inclined bottom edge comprises an edge that tapers outwardly from the scanning beam window in a scanning beam transmission direction.

17. The reflection measurement device of claim 13, further comprising:

a return inlet window, adjacent the scanning beam window and defined by the front panel, through which a return scanning beam may pass; and a return inlet window protective member that is transparent to the return scanning beam and that is for covering the return inlet window opposite a return scanning beam inlet side;

wherein the return inlet window includes an inclined return inlet window bottom edge that forms an inlet window rain guide for channeling rainwater away from the return scanning beam.

18. The reflection measurement device of claim 17, wherein the inclined return inlet window bottom edge comprises a V-shaped inclined return inlet window bottom edge.

* * * * *